US007841766B2

(12) United States Patent
Kanamori et al.

(10) Patent No.: US 7,841,766 B2

(45) Date of Patent: Nov. 30, 2010

(54) METAL SURFACE TEMPERATURE MEASURING INSTRUMENT

(75) Inventors: Hideo Kanamori, Ichihara (JP); Katsumi Ichitani, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 304 days.

(21) Appl. No.: 11/815,939

(22) PCT Filed: Mar. 14, 2006

(86) PCT No.: PCT/JP2006/305005

§ 371 (c)(1), (2), (4) Date: Aug. 9, 2007

(87) PCT Pub. No.: WO2006/100965

PCT Pub. Date: Sep. 28, 2006

(65) Prior Publication Data

US 2009/0028210 A1 Jan. 29, 2009

(30) Foreign Application Priority Data

Mar. 22, 2005 (JP) ............................ 2005-082388

(51) Int. Cl.
*G01K 3/00* (2006.01)
*G01K 7/00* (2006.01)
*G01K 1/00* (2006.01)

(52) U.S. Cl. ......................... 374/43; 374/102; 374/208; 374/179

(58) Field of Classification Search ................. 374/208, 374/102, 179, 43
See application file for complete search history.

(56) References Cited

U.S. PATENT DOCUMENTS 2,717,515 A * 9/1955 Pesante ...................... 374/43
3,620,068 A * 11/1971 Cary et al. .................... 374/43
3,680,356 A * 8/1972 Felton, Jr. .................... 374/57
4,106,331 A * 8/1978 Bunton et al. ............. 73/61.46
4,412,752 A * 11/1983 Cellitti et al. ................. 374/43
4,722,611 A * 2/1988 Hultgren ...................... 374/43
5,178,463 A * 1/1993 Berry et al. ................... 374/43
6,257,004 B1 * 7/2001 Gendron et al. ............... 62/129
2007/0047614 A1 * 3/2007 Lee et al. ...................... 374/44
2007/0071063 A1 * 3/2007 Liu et al. ...................... 374/15

FOREIGN PATENT DOCUMENTS

JP 60 190847 9/1985
JP 1 198422 8/1989
JP 05264487 A * 10/1993
JP 5 340900 12/1993
JP 6 294794 10/1994

* cited by examiner

*Primary Examiner*—Lisa M Caputo
*Assistant Examiner*—Mirellys Jagan
(74) *Attorney, Agent, or Firm*—Oblon, Spivak, McClelland, Maier & Neustadt, L.L.P.

(57) ABSTRACT

A metal surface temperature measuring device includes: a container to contain a coolant; a measurement target; a heater to heat the measurement target; a moving mechanism for moving the measurement target; and a thermometer to measure the surface temperature of the measurement target. A main body of the measurement target is formed of silver or copper, and a surface of the main body is coated with a thin film of pure iron or an iron alloy at a thickness of 1 to 100 μm. Further, at least the container, the heater, and the measurement target are disposed in a chamber of an inert gas atmosphere.

4 Claims, 8 Drawing Sheets

11:SUPPORT
INSULATING TUBE
16:SILVER WIRE
15:SILVER PIPE
17:HEAT-RESISTANT INSULATING MATERIAL
13:ALUMEL WIRE
13a:BALL
14: INSULATING TUBE
12:MAIN BODY
12a:THIN FILM

10:MEASUREMENT TARGET
1: HEATING ELECTRIC FURNACE
20:CHAMBER
11a
2:SAMPLE CONTAINER
3:THERMOMETER
4:RECORDER

A: SILVER B: SILVER + IRON PLATING C: IRON

A: SILVER B: SILVER + IRON PLATING C: IRON

A: SILVER B: SILVER + IRON PLATING

METAL SURFACE TEMPERATURE MEASURING INSTRUMENT

TECHNICAL FIELD

The present invention relates to a device which measures the surface temperature of a metal, and more particularly, it relates to a metal surface temperature measuring device suitable to measure the surface temperature of a metal such as steel having a low thermal conductivity.

BACKGROUND ART

Standards are set in accordance with Japanese Industrial Standards (JIS) concerning processing oils, for example, coolants for use in heat treatments such as quenching processing, coolants or lubricants for use in hot processing (rolling or forging), cutting liquids and cold rolling oils, because predetermined quality and properties are required.

For example, a standard is set in JIS K2242 (standard name: heat treating oils) for the coolants used in heat treatments such as quenching processing.

In this JIS K2242, the kinds of coolants are classified in accordance with uses, and the quality and properties (cooling performance, stability) are standardized for each kind. Specifically, use is made of a surface temperature measuring device which comprises a heating electric furnace as a heater, a silver bar as a measurement target, and a thermometer. The heated silver bar is rapidly put into a sample (coolant to be inspected), and a cooling curve is obtained using a temperature change in the silver bar at this moment as a function of time. On the basis of this cooling curve, a characteristic temperature and a cooling time from 800° C. to 400° C. are measured up to 1/10 seconds, thereby obtaining cooling performance.

Thus, while the silver bar is used as the measurement target in the surface temperature measuring device conforming to JIS K2242, steel is often the metal that is actually quenched. Nevertheless, the silver bar is used as the measurement target for the following reasons.

Firstly, because steel has poor thermal conductivity and a wide temperature distribution, temperature changes in the surface of the measurement target can not be measured with good sensitivity (see C in FIG. 4). On the assumption that steel heated to a high temperature is put in the heat treating oil (coolant), a large temperature difference is produced from the surface to the center of steel in a short time. Moreover, the closer the steel surface is, the steeper temperature gradient is. The reason is that the transfer of the heat inside steel to the surface side thereof does not catch up with the release of the heat from the surface of steel due to the low thermal conductivity of steel. For example, the thermal conductivity of chrome-molybdenum steel is only about one tenth of the thermal conductivity of silver.

Secondly, the silver bar has heretofore been used because the surface of steel is oxidized under an air atmosphere.

Therefore, in the conventional metal surface temperature measuring devices, there has been a problem that the temperature change in the surface of steel during quenching processing can not be accurately measured.

The present invention has been made in view of the foregoing circumstances, and is directed to provide a metal surface temperature measuring device which makes it possible to rapidly measure the surface temperature of a metal such as steel having a low thermal conductivity in accordance with the kind of coolant and heat treatment conditions such as a heat treatment temperature.

DISCLOSURE OF THE INVENTION

In order to achieve the above-mentioned object, the present invention provides a metal surface temperature measuring device comprising: a container to contain a coolant; a measurement target; a heater to heat the measurement target; moving means for moving the measurement target; and a thermometer to measure the surface temperature of the measurement target, wherein a main body of the measurement target is formed of silver or copper, and a thin film made of a metal having a low thermal conductivity is formed on a surface of the main body.

Here, the thin film of the measurement target includes a thin film of pure iron or an iron alloy.

In such a configuration, temperature changes in the surface of the metal having a low thermal conductivity (this may hereinafter be simply referred to as "steel") can be measured at a speed corresponding to the thermal conductivity of silver or copper, and the measurement can be rapidly carried out in accordance with the kind of coolant and heat treatment conditions such as a heat treatment temperature.

Furthermore, in the configuration of the present invention, the thin film of the measurement target is formed of pure iron or an iron alloy, and at least the container, the heater and the measurement target are disposed in a chamber of an inert gas atmosphere.

Thus, even if pure iron or an iron alloy that is easily oxidized is used for the measurement target, it is possible to prevent the oxidation of the thin film on the surface of the measurement target because a measurement atmosphere is set to the inert gas atmosphere. Inert gas is preferably nitrogen gas.

Furthermore, in the surface temperature measuring device of the present invention, the thin film is 1 to 100 μm in thickness. In such a configuration, the temperature changes in the surface of the metal can be measured in conformity to the standard JIS K2242 without suffering adverse effects of the low thermal conductivity of a metal such as steel.

As described above, according to the present invention, it is possible to measure the temperature of the surface of the metal having a low thermal conductivity in conformity to the standard JIS K2242.

BEST MODE FOR CARRYING OUT THE INVENTION

One embodiment of the present invention will hereinafter be described with reference to the drawings.

First, an outline of an entire surface temperature measuring device according to one embodiment of the present invention will be described.

Figure 1:
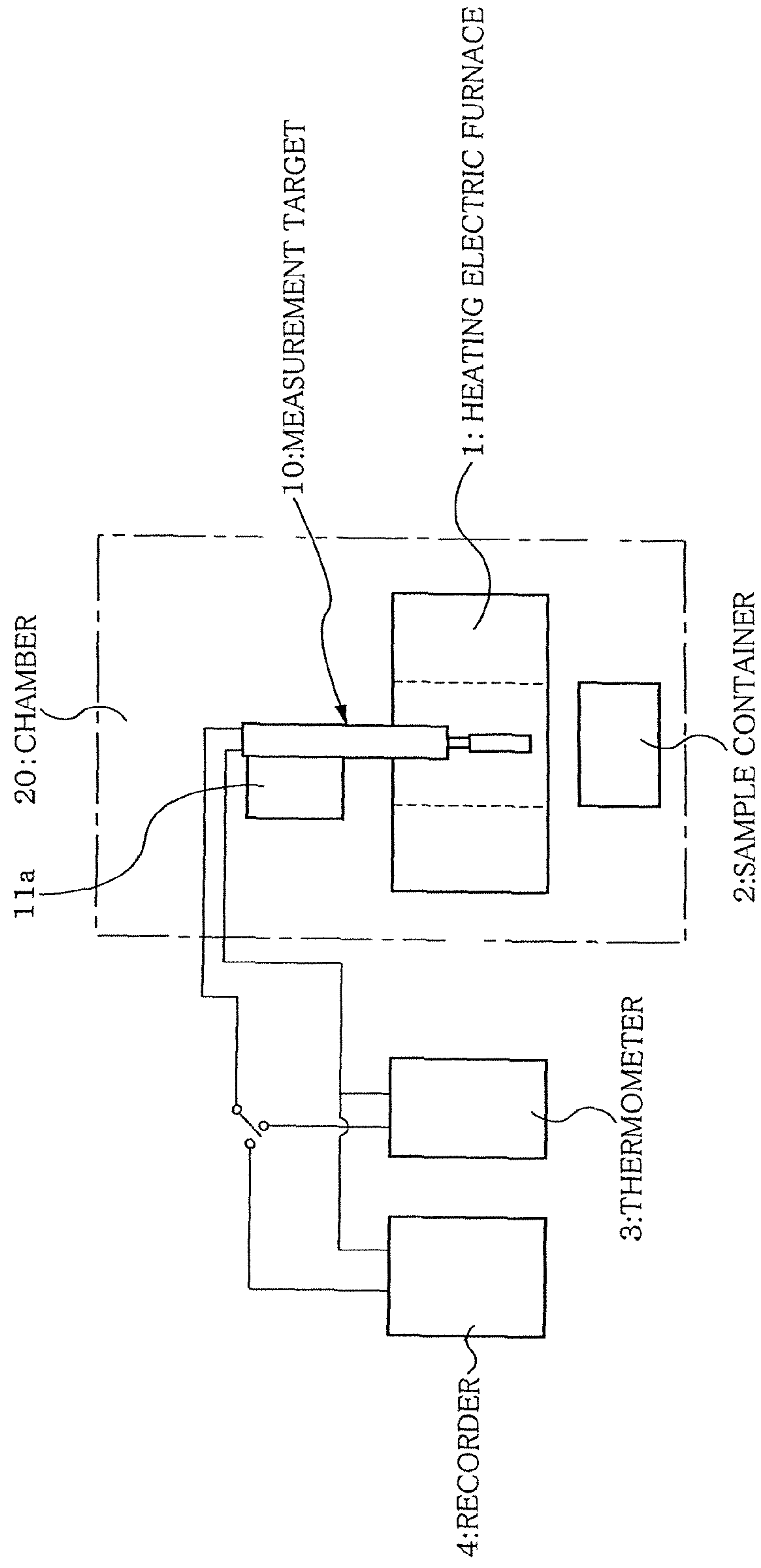
FIG. 1 is a schematic configuration diagram of a surface temperature measuring device according to one embodiment of the present invention.

FIG. 1 is a schematic configuration diagram of the surface temperature measuring device according to one embodiment of the present invention.

As shown in FIG. 1, the present device comprises a heating electric furnace 1 as a heater, a sample (coolant) container 2, a measurement target 10, a thermometer 3 and a recorder 4.

The heating electric furnace 1 heats the measurement target 10 to a predetermined temperature (about 800° C.), and the heating electric furnace used is a nondielectric type in which a strong magnetic field or alternating magnetic field is not formed in the furnace. The sample container 2 is a container to contain a coolant (sample) to be inspected, and disposed under the measurement target 10. The thermometer 3 has a thermocouple part, and its measuring unit is incorporated in the measurement target 10. The thermometer 3 measures the temperature of the surface of the measurement target. The recorder 4 records the temperature measured by the thermometer 3.

The heating electric furnace 1, the sample (coolant) container 2 and the measurement target 10 are disposed in a chamber 20, and inert gas (nitrogen gas) is supplied into the chamber 20. That is, the metal surface temperature measuring device in the present embodiment carries out a temperature measurement under an inert gas atmosphere.

Figure 2:
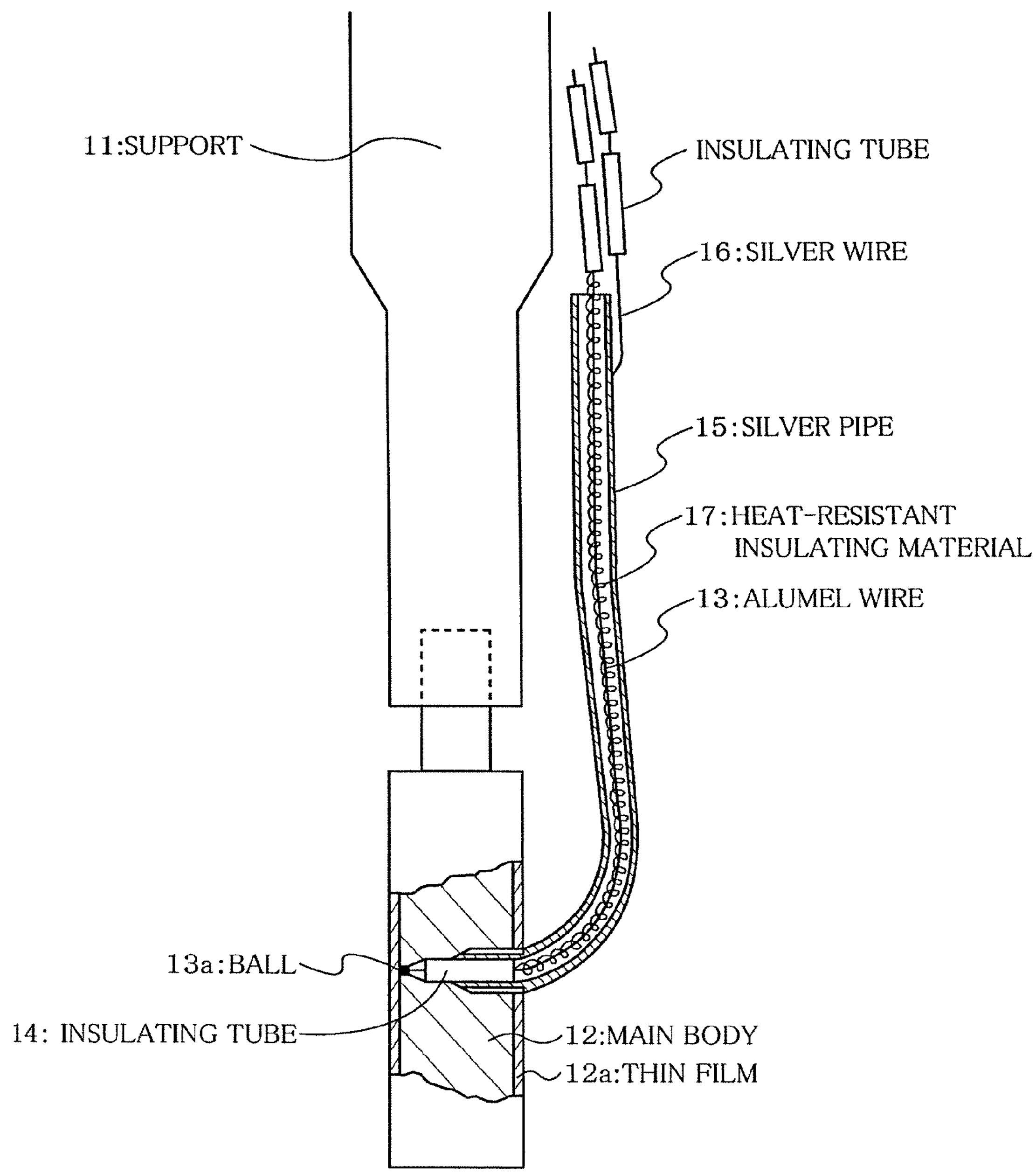
FIG. 2 is a view of a measurement target according to the embodiment of the present invention partially in section.

FIG. 2 is a detail view of the measurement target partially in section.

The measurement target 10 comprises a support 11 which can be moved up and down by moving means 11*a*, and a main body 12 screwed in and supported by the support 11, and a measuring unit of a thermocouple is incorporated in the main body 12. The main body 12 is made of silver, and has its outer peripheral surface coated with a thin film 12*a* made of a metal having a low thermal conductivity such as steel. In the present embodiment, the main body 12 on which the thin film 12*a* is formed is sized at 10 mm in diameter and 30 mm in length.

The coating of the thin film 12*a* is carried out in a method such as plating, vapor deposition or sputtering, and the thin film is preferably 1 to 100 μm in thickness. At a thickness smaller than 1 μm, it is difficult to obtain a uniform thin film, and at a thickness larger than 100 μm, an accurate temperature measurement is difficult due to adverse effects of the low thermal conductivity of steel or the like.

Here, metals having a low thermal conductivity include nickel-chrome-molybdenum steel, carbon steels for machine structural use, high-speed tool steel, stainless steel, etc, as well as pure iron and chrome-molybdenum steel.

Furthermore, metals having a low thermal conductivity other than iron-based materials include chrome, titanium and their nitrides.

Into the main body 12 of the measurement target 10 coated with the thin film 12*a*, an alumel wire 13 of a thermocouple is inserted via an insulating tube 14. The tip of the alumel wire 13 is a ball 13*a*, and this ball 13*a* is located in close vicinity to the surface of the main body 12 made of silver, but does not contact the thin film 12*a*. This ball 13*a* at the tip functions as a temperature measuring junction of the thermocouple. The silver main body 12 is connected to a main body of the thermometer 3 through a silver pipe 15 and a silver wire 16. Moreover, the alumel wire 13 runs inside the silver pipe 15 via a heat-resistant insulating material 17, and is connected to the thermometer 3.

It is to be noted that the whole periphery of the silver main body 12 is coated with the steel thin film 12*a* in the embodiment shown in FIG. 2.

A metal having a high thermal conductivity such as copper as well as silver can be used for the main body 12 of the measurement target 10. When copper is used for the main body 12, a copper-constantan thermocouple is used as the thermocouple. The thermocouple is attached to the main body 12 in the same manner as when silver is used for the main body 12.

A temperature measurement using the metal surface temperature measuring device having such a configuration is carried out as follows.

In the heating electric furnace 1, the main body 12 of the measurement target 10 is heated to the predetermined temperature (about 800° C.), and then the support is lowered and put into the sample container 2. Since the coolant to be tested is contained in the sample container 2, the thin film 12*a* and the main body 12 of the measurement target 10 are rapidly cooled off, so that the surface temperature thereof changes. The thermometer 3 measures this temperature change via the thermocouple, which is recorded by the recorder 4. It is to be noted that a cooling curve can be obtained using the temperature change as a function of time.

EXAMPLES AND COMPARATIVE EXAMPLES

Example 1

A case where a measurement target plated with a steel thin film was used for a main body made of silver.

Pure iron was used as steel. The thickness of the plated layer was 100 μm.

250 ml of cold quenching oil "Daphne Master Quench A" (manufactured by Idemitsu Kosan Co., Ltd.) was put as a coolant into a sample container, and it was heated to 80° C. The measurement target heated to 810° C. in an electric furnace was put in the coolant, and a surface temperature thereof was measured. The measurement was carried out under a nitrogen gas atmosphere.

Figure 3:
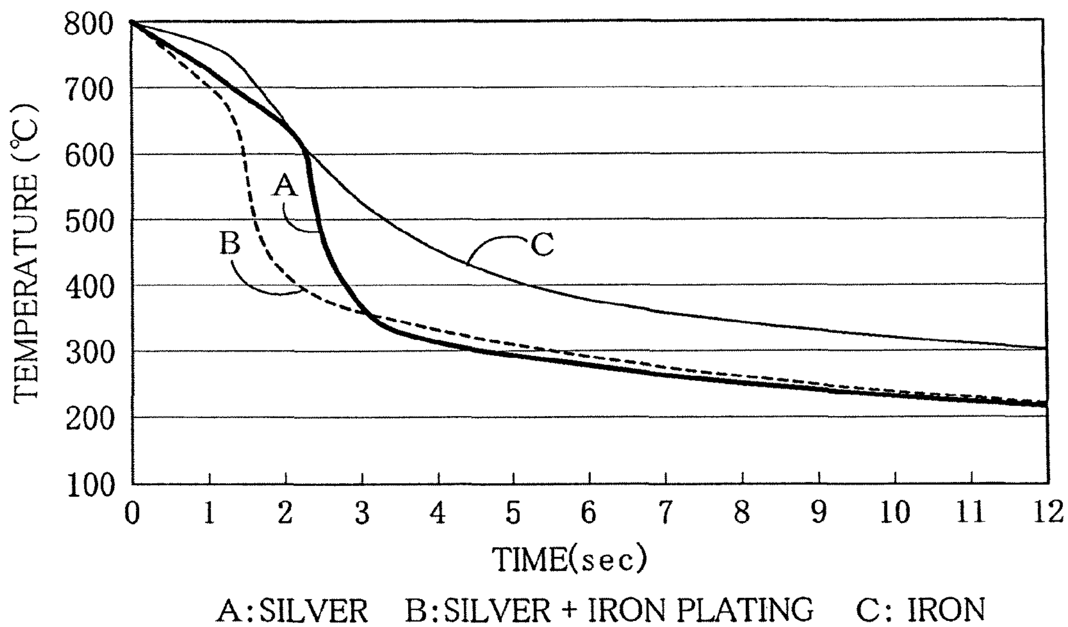
FIG. 3 is a graph showing measuring time of a temperature change (cooling temperature) for each kind (Example 1, Comparative Examples 1, 2) of measurement target.

As to the rest, the surface temperature was measured in conformity to JIS K2242. As a result, a cooling curve indicated by B in FIG. 3 was obtained.

Comparative Example 1

A case where a measurement target made of silver was used.

A measurement target having a main body made of silver was used. A measurement was carried out under an air atmosphere. As to the rest, the measurement was carried out as in Example 1. As a result, a cooling curve indicated by A in FIG. 3 was obtained.

Comparative Example 2

A case where a steel measurement target was used.

A measurement target having a steel main body was used. Chrome-molybdenum steel (JIS G 4105 SCM420) was used. In a measurement, a K-type grounded SK-class (JIS C 1605) sheath thermocouple was used in which the material of the sheath was a corrosion-resistant heat-resistant super alloy and the outside diameter of the sheath was 1.0 mm. This sheath thermocouple was inserted and placed at the same position as a thermocouple insertion position in FIG. 2. As to the rest, the measurement was carried out as in Example 1. As a result, a cooling curve indicated by C in FIG. 3 was obtained.

Example 2

A case where a measurement target plated with a steel thin film was used for a main body made of silver.

Figure 5:
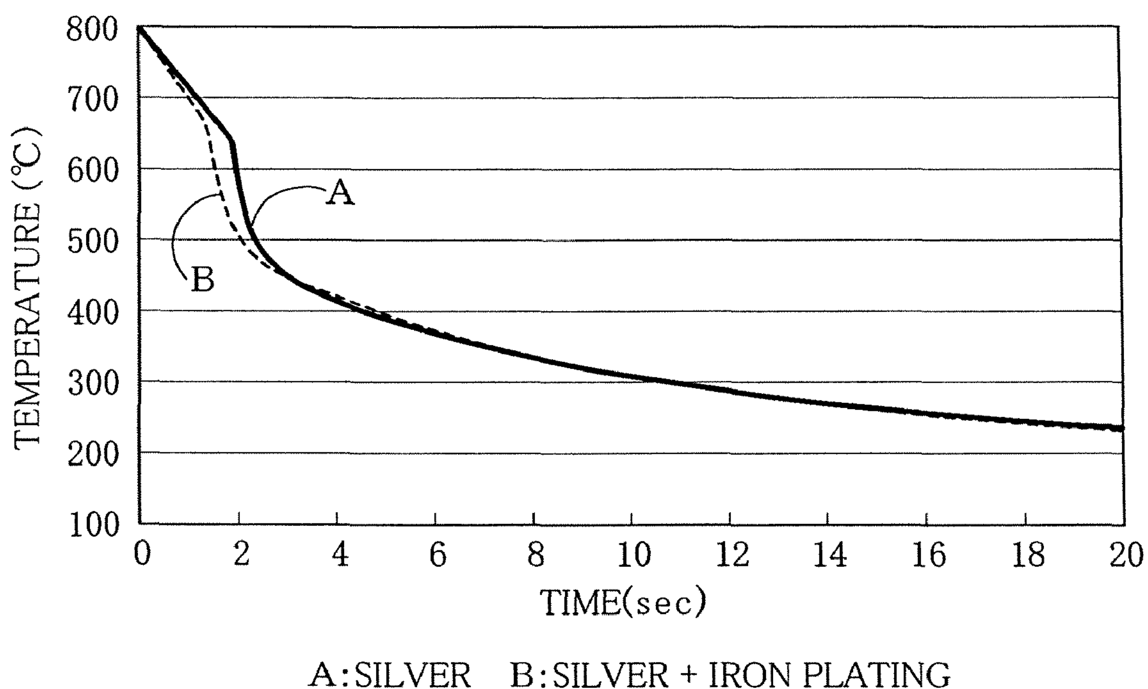
FIG. 5 is a graph showing measuring time of temperature changes (cooling temperature) in Example 2 and Comparative Example 3.
Figure 6:
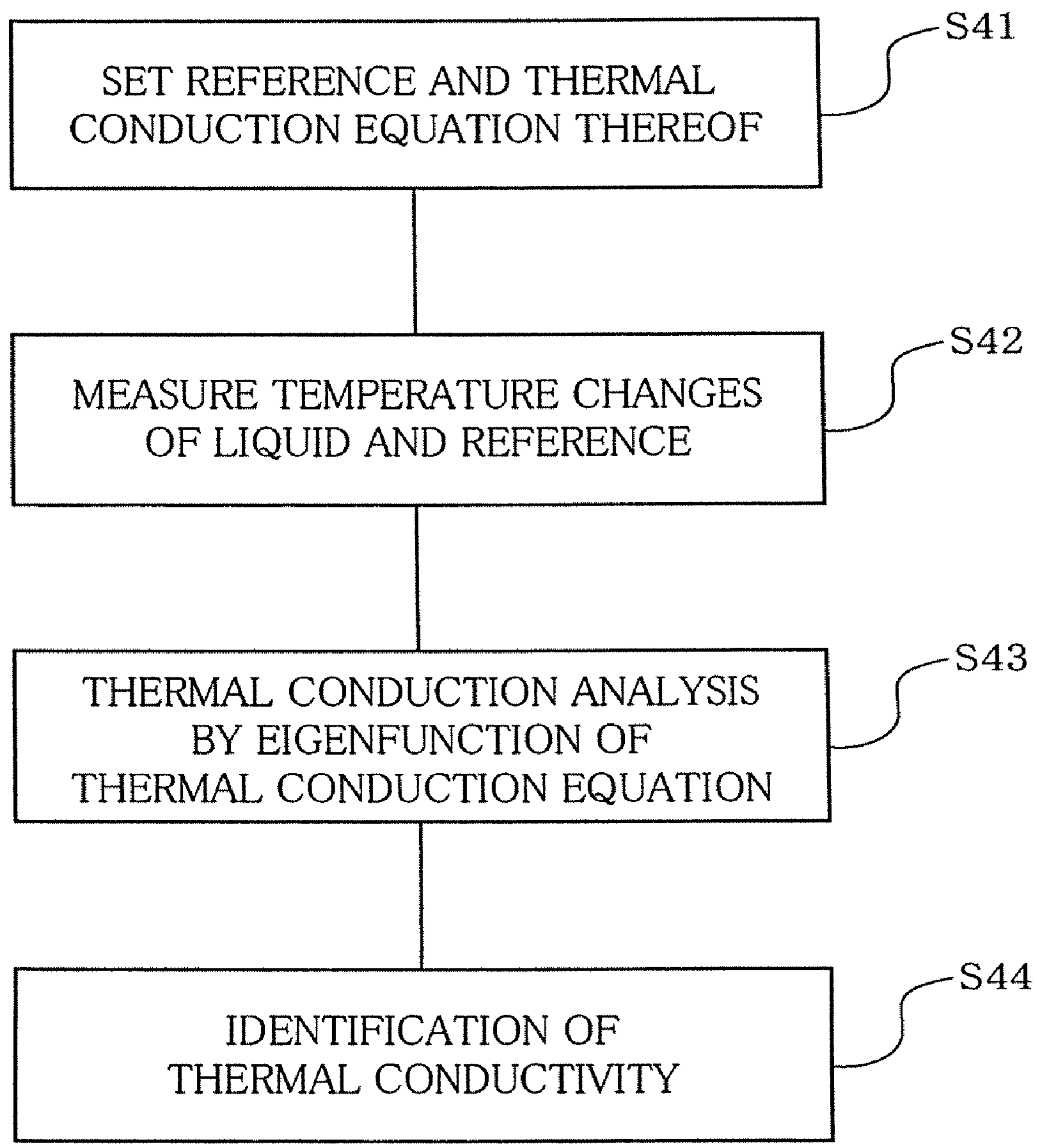
FIG. 6 is a flowchart showing a procedure in a heat transfer capability evaluation method disclosed in Japanese Patent Publication Laid-open No. 07-146264.

A hot quenching oil "Daphne HI-Temp Oil A" (manufactured by Idemitsu Kosan Co., Ltd.) was used as a coolant, and it was heated to 120° C. As to the rest, the measurement was carried out as in Example 1. As a result, a cooling curve indicated by B in FIG. 5 was obtained.

Comparative Example 3

A case where a measurement target made of silver was used.

A hot quenching oil "Daphne HI-Temp Oil A" (manufactured by Idemitsu Kosan Co., Ltd.) was used as a coolant, and it was heated to 120° C. As to the rest, the measurement was carried out as in Comparative Example 1. As a result, a cooling curve indicated by A in FIG. 5 was obtained.

Comparison of Measurement Results

Measurement results of Examples and Comparative Examples were compared using heat treatment simulation software and actual measurement values.

Figure 7:
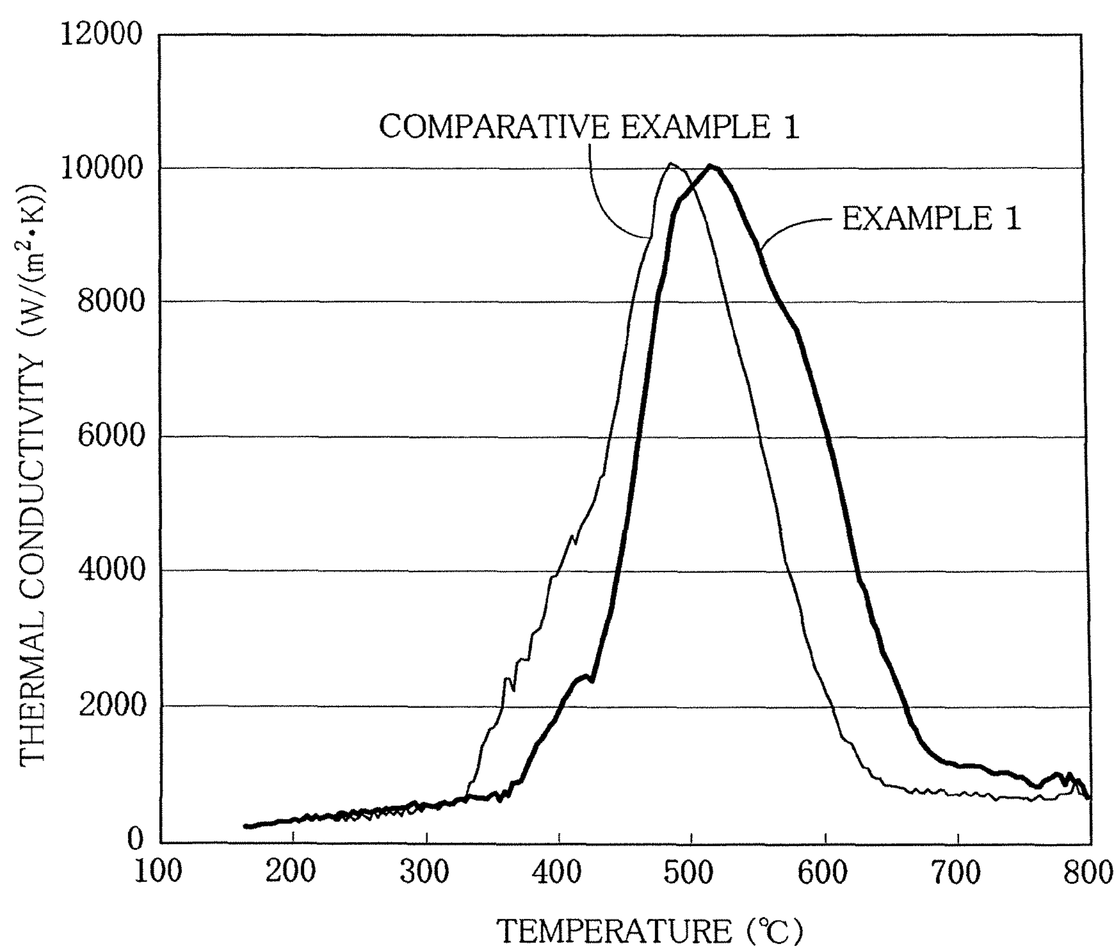
FIG. 7 is a graph showing the relation between a heat transfer coefficient and temperature.

"DEFORM™-HT" (Yamanaka Eng. Co., Ltd.) was used as the heat treatment simulation software. Concerning data on thermal conductivity, etc. of steel, database MATEQ of The Society of Materials Science, Japan was used. By use of the above-mentioned measurement results of surface temperatures, the thermal conductivity in the surface of steel was calculated by the solution of a thermal conduction equation with Bessel function described in Japanese Patent Publication Laid-open No. 07-146264. Calculated results are shown in FIG. 7.

Figure 8:
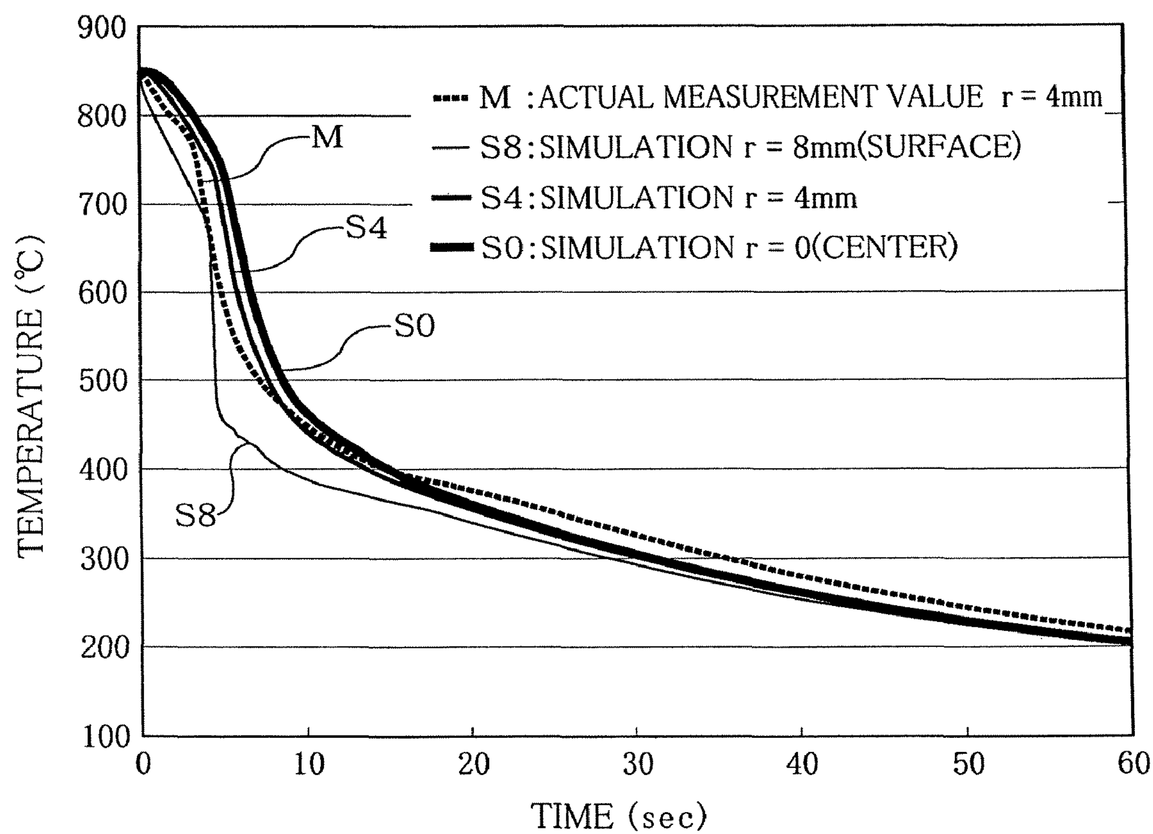
FIG. 8 is a comparative graph showing an actual measurement value of temperature characteristics when a measurement target whose main body is coated with iron is used and results of simulations.
Figure 9:
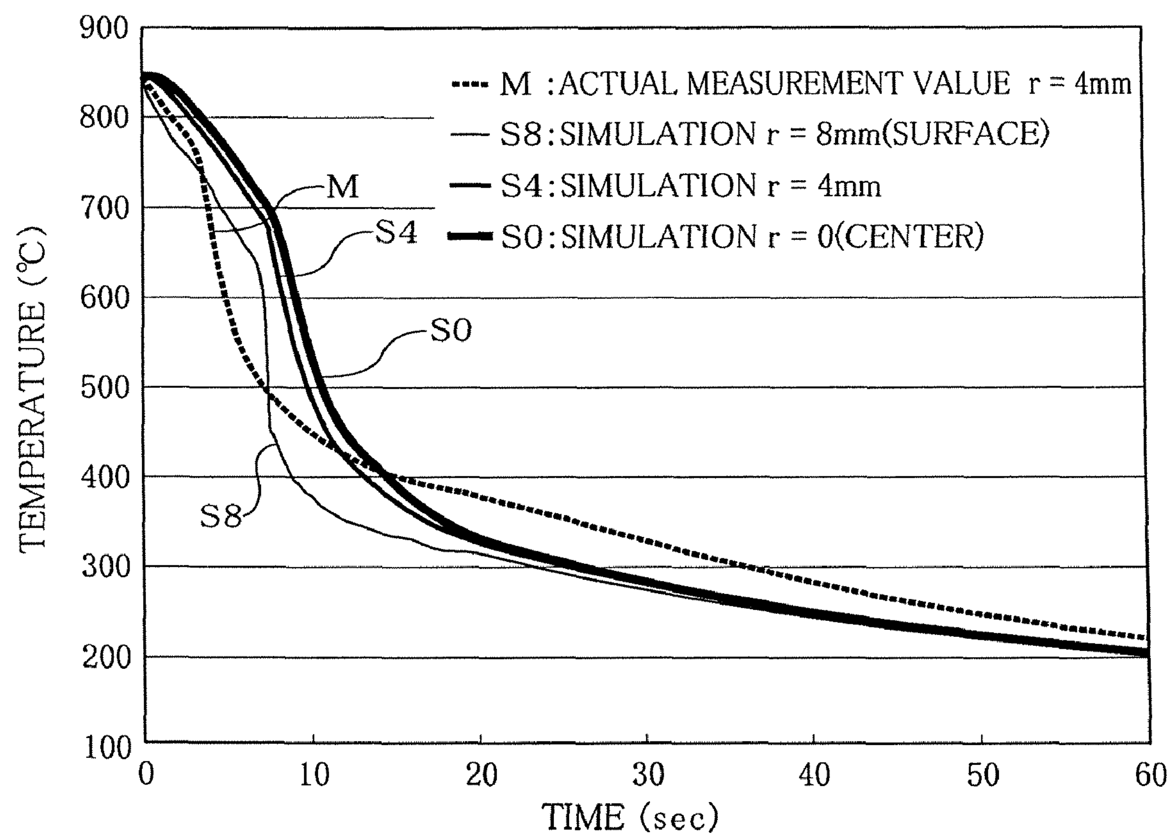
FIG. 9 is a comparative graph showing an actual measurement value of temperature characteristics when a measurement target whose main body is made of silver is used and results of simulations.

Furthermore, a simulation was done concerning temperature characteristics at the surface of a measurement target (cylindrical model) with a radius of 8 mm, at a place 4 mm from the surface, and at a central position thereof. Results of the simulation are shown in FIGS. 8 and 9. FIG. 8 shows simulation results using a heat transfer coefficient calculated on the basis of the surface temperature measured by a measurement target whose main body is coated with iron, and an actual measurement value. FIG. 9 shows simulation results using a heat transfer coefficient calculated on the basis of the surface temperature measured by a measurement target whose main body is made of silver, and an actual measurement value.

On the other hand, in an actual measurement, a cylindrical steel measurement target with a radius of 8 mm and a length of 30 mm was used. A sheath thermocouple was attached to the measurement target at a distance of 4 mm from a central line thereof and in parallel with the central line. As to the rest, the measurement was carried out as in Comparative Example 2 (Example 1).

This proved that the results were closer to the actual measurement values when the measurement results of surface temperature in Example 1 were used.

Here, a heat transfer capability evaluation method described in Japanese Patent Publication Laid-open No. 07-146264 is briefly explained. This method has been proposed by the present applicant.

First, a reference body is set whose physical shape is identical with or similar to that of an evaluation target in a heat treatment process, and a thermal conduction equation is created which expresses heat transfer between this reference body and a evaluation target liquid (step 41).

That is, by use of the reference body whose physical shape is identical with or similar to that of the evaluation target, a cooling model M is set which represents a cooling process to do a heat treatment simulation, and a thermal conduction equation in this cooling model M is created. This thermal conduction equation is derived from a general equation expressing thermal conduction in accordance with the shape, etc. of the cooling model M.

Next, temperature changes of the reference body and the liquid in the heat treatment process are measured (step 42). That is, a cooling curve in the cooling model M is measured and obtained after setting the kind of liquid in a heat treatment or the like, and the temperature of a material and the temperature of the liquid before the heat treatment.

Subsequently, the thermal conduction equation is analyzed using an eigenfunction (step 43), and a heat transfer coefficient is identified (step 44).

Figure 4:
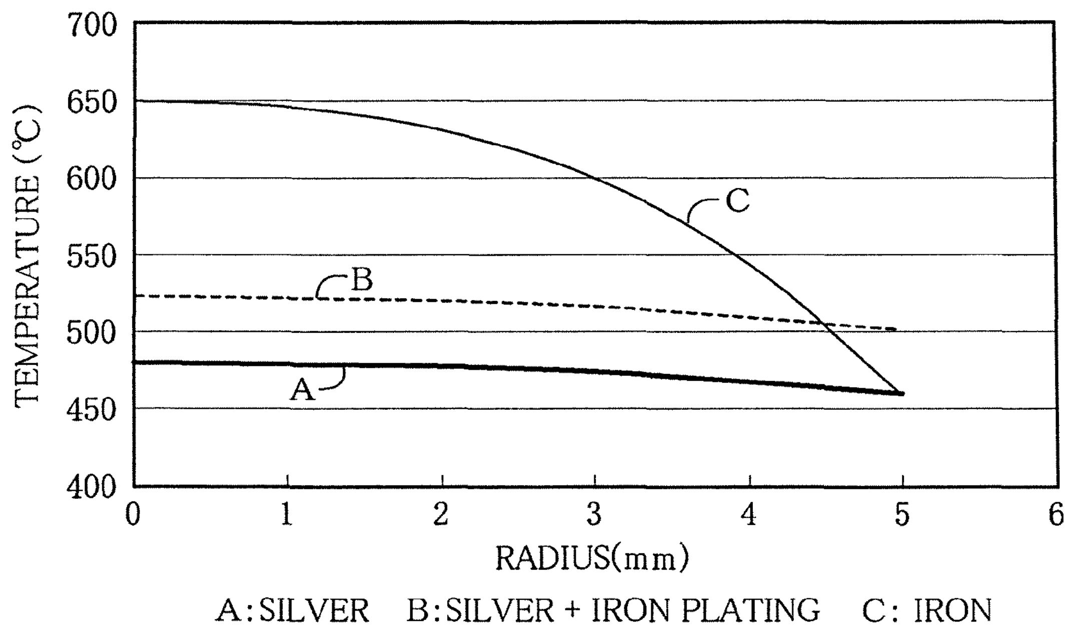
FIG. 4 is a graph showing radial temperature distribution for each kind of measurement target.

In addition, the above-mentioned heat treatment simulation software was used to form measurement targets (cylinders with a radius of 5 mm) of silver (silver identical with that in Comparative Example 1), of steel (chrome-molybdenum steel identical with that in Comparative Example 2) and of silver plated with steel, and temperature distributions in a radial direction from the centers of the measurement targets were analyzed. FIG. 4 shows results in which maximum temperature distributions were generated in the respective analyses.

That is, in the measurement target made of iron alone, there is a temperature difference of about 80° C. between the surface and a place at a distance of 1 mm from the surface. This means that even if a temperature measuring junction of the thermocouple is disposed in the vicinity of the surface of the measurement target, displacement of only 0.1 mm in the position to dispose the temperature measuring junction produces a large difference of about 8° C. In this respect, an accurate temperature measurement can not be expected in a surface temperature measuring device in which the thermocouple is provided in the measurement target made of a material having a low thermal conductivity such as steel. It is also obvious that there is a large difference in measurement accuracy among such devices, so that those devices can not be regarded as reliable.

INDUSTRIAL APPLICABILITY

The present invention can be widely used, for example, in a cooling capability test of a coolant in accordance with JIS K2242, and in a heat treatment simulation technique in conformity to JIS K2242. More particularly, the present invention can be effectively used, for example, in a cooling capability test of a coolant and a heat simulation technique for a metal having a low thermal conductivity.

The invention claimed is:

1. A metal surface temperature measuring device comprising:

a measurement target;

a heater to heat the measurement target;

a container to contain a coolant for cooling the measurement target that has been heated by the heater; and moving means for moving the measurement target between the heater and the container and putting the measurement target heated by the heater in the coolant, wherein in the measurement target a main body of the measurement target is formed of silver or copper, the whole periphery of the main body is coated with a thin film made of a metal having a low thermal conductivity, an insulating tube is provided such that the insulating tube penetrates the thin film and is positioned in the main body, a wire for a thermocouple is inserted into the main body via the insulating tube, and the thermocouple is formed of the wire and silver or copper.

2. The metal surface temperature measuring device according to claim 1, wherein the thin film is 1 to 100 μm in thickness.

3. The metal surface temperature measuring device according to claim 1, wherein the thin film of the measurement target is a thin film of pure iron or an iron alloy, and at least the container, the heater and the measurement target are disposed in a chamber of an inert gas atmosphere.

4. The metal surface temperature measuring device according to claim 3, wherein the thin film is 1 to 100 μm in thickness.

* * * * *